(12) United States Patent
Crowle et al.

(10) Patent No.: US 7,983,276 B2
(45) Date of Patent: Jul. 19, 2011

(54) TIMING SOURCE

(75) Inventors: Martin Richard Crowle, Devon (GB); Timothy Michael Edmund Frost, Plymouth (GB)

(73) Assignee: Zarlink Semiconductor Limited, Wiltshire (GB)

( * ) Notice: Subject to any disclaimer, the term of this patent is extended or adjusted under 35 U.S.C. 154(b) by 374 days.

(21) Appl. No.: 11/725,542

(22) Filed: Mar. 20, 2007

(65) Prior Publication Data

US 2007/0223459 A1 Sep. 27, 2007

Related U.S. Application Data

(60) Provisional application No. 60/783,854, filed on Mar. 21, 2006.

(30) Foreign Application Priority Data

Nov. 16, 2006 (GB) .................................. 0622834.0

(51) Int. Cl.
*H04L 12/56* (2006.01)
(52) U.S. Cl. ..................... 370/395.61; 370/350; 709/233
(58) Field of Classification Search .................. 370/497, 370/350, 370, 395.62, 509, 519; 709/233
See application file for complete search history.

(56) References Cited

U.S. PATENT DOCUMENTS

| | | | |
|---|---|---|---|
| 6,665,316 B1 * | 12/2003 | Eidson | 370/509 |
| 6,769,030 B1 * | 7/2004 | Bournas | 709/233 |
| 7,289,538 B1 * | 10/2007 | Paradise et al. | 370/497 |
| 2003/0137997 A1 * | 7/2003 | Keating | 370/519 |
| 2003/0219012 A1 | 11/2003 | Wisler et al. | |
| 2004/0114602 A1 | 6/2004 | Ko et al. | |
| 2005/0018692 A1 * | 1/2005 | Orberk et al. | 370/395.62 |
| 2005/0152356 A1 | 7/2005 | Powers | |
| 2006/0056563 A1 * | 3/2006 | Aweya et al. | 375/376 |
| 2007/0097947 A1 * | 5/2007 | Aweya et al. | 370/350 |

FOREIGN PATENT DOCUMENTS

| | | |
|---|---|---|
| DE | 10 2005 029 438 A1 | 3/2006 |
| EP | 1 455 473 B1 | 9/2004 |
| GB | 2 421 141 A | 6/2006 |
| JP | 2000-349824 A | 12/2000 |

* cited by examiner

*Primary Examiner* — Albert T Chou
(74) *Attorney, Agent, or Firm* — Arent Fox, LLP

(57) ABSTRACT

A timing source is provided for sending timing information via a packet network. The source comprises a clock for generating the timing information and a packet-forming section for forming a sequence of packets for transporting the timing information to a destination node. A time-stamping section inserts into each packet of the sequence a transmission time derived from the clock and acts as an output section for forwarding the packets to the network at the respective transmission times. In one mode, the packet forming section forms all of the packets of the sequence with the largest size which the packet network is capable of transporting. In another mode, the packets of the sequence have a distribution of sizes which may be fixed or which may vary in response to traffic conditions.

29 Claims, 3 Drawing Sheets

-- PRIOR ART --

TIMING SOURCE

CROSS-REFERENCE TO RELATED APPLICATION

The application claims benefit under 35 U.S.C. §119 to U.S. Provisional Patent Application No. 60/783,854 filed Mar. 21, 2006, entitled "Timing Source", and also claims the benefit of priority from Great Britain Application 0622834.0 filed on Nov. 16, 2006. The entire contents of these applications are incorporated herein in its entirety by reference.

TECHNICAL FIELD

The present invention relates to a timing source for sending timing information via a packet network. Such a source is applicable in particular, though not necessarily, to the synchronisation of clocks associated with time division multiplexed transmission links interconnected by a packet network.

BACKGROUND

Communication networks typically make use of one of two well established transmission mechanisms; circuit switched transfer and packet switched (or just packet) transfer. Older systems tend to use the former, and in the main use time division multiplexing to divide the time domain, for a given frequency band, into time slots of equal duration. Circuits are defined by grouping together identical slot positions in successive time frames. Packet networks typically do not allocate fixed resources to transmitters, but rather route packets of data on a best efforts basis, using destination address information contained in packet headers, and network switches and routers. Packet networks are becoming more popular amongst network operators as they often provide better performance, and are more cost effective to install and maintain, than equivalent circuit switched networks.

Traditionally, telecommunication networks have made use of time division multiplexed (TDM) circuits to interconnect network switches (or exchanges). However, for the above mentioned reasons of performance and cost, many operators and leased line providers (who provide bandwidth to service providers) are moving towards replacing TDM circuits with packet networks. In many cases, switch to switch "sessions" will be provided entirely over packet networks. However, it is likely that, for many years to come, some operators will continue to rely upon TDM circuits to provide all or at least a part of the networks. This will necessitate interworking between packet networks and TDM "legacy" equipment.

FIG. 1 of the accompanying drawings illustrates schematically a carrier network 1 which is a packet switched network such as an Ethernet, ATM, or IP network. The carrier network provides leased line services to interconnect first and second customer premises 2,3, both of which make use of TDM transmitters 4,5 to handle multiple information streams. The nature of these streams is unimportant, although they could for example be voice calls, videoconference calls, or data calls. In order to facilitate the interconnection of the TDM streams, the carrier network 1 must emulate appropriate TDM circuits.

TDM links are synchronous circuits with a constant (transmission) bit rate governed by a service clock operating at some predefined frequency. In contrast, in a packet network there is no direct link between the frequency at which packets are sent from an ingress port and the frequency at which they arrive at an egress port. With reference again to FIG. 1, in order to provide TDM circuit emulation, interface nodes 6,7 at the edges of the packet network must provide interworking between the TDM links and the packet network in such a way that the TDM link at the egress side is synchronised with the TDM link at the ingress side. In other words, the TDM service frequency ($f_{service}$) at the customer premises 2 on the ingress side must be exactly reproduced at the egress of the packet network ($f_{regen}$). The consequence of any long-term mismatch in these frequencies will be that the queue 10 at the egress of the packet network 1 will either fill up or empty, depending upon on whether the regenerated clock ($f_{regen}$) is slower or faster than the original clock ($f_{service}$), causing loss of data and degradation of the service. Also, unless the phase of the original clock ($f_{service}$) is tracked by that of the regenerated clock ($f_{regen}$), the lag in frequency tracking will result in small but nonetheless undesirable changes to the operating level of the queue 10 at the egress.

Some reliable method for synchronising both the frequency and phase of the clock at the egress of a packet network to those of the clock at the TDM transmitter must be provided. One approach is to use some algorithm to recover the transmitting clock frequency and phase from timestamps incorporated into packets by the sender, taking into account the transmission delay over the packet network. As the transmission time over the packet network is unpredictable for any given packet, an adaptive algorithm might be used. For example, some form of averaging might be employed to take into account variations in the transmission delay. For ATM, ITU standard I.363.1 and ATM Forum standard af-vtoa-0078 explain the concept of an adaptive clock recovery mechanism in general terms.

EP 1455473 discloses a technique for synchronising the clock at an egress side of a packet network to the clock of a TDM transmitter. According to this technique, the egress clock is adjusted in accordance with variations in the minimum transmit time of packets received in consecutive time periods.

The quality of the reference clock recovered at the timing destination is subject to degradation based on the other traffic on the packet network and on the packet rate used to transfer the timing information. In general, the packet rate and packet size are set as low as possible to conserve the bandwidth consumed in transporting the clock.

In general, the elements within a packet network operate by receiving a packet completely before forwarding it to the next element in the network using the appropriate port; this is known as "store and forward". Thus, more time will be taken to forward a large packet than a small packet through such a network element. The packet delay in microseconds associated with the store and forward process for a single node of the network is shown in the following table for various packet sizes and link rates. The times specified in this table relate only to the data bits of the packets and do not take account of any post or pre-amble that may be associated with the "physical layer" of the network.

|                 | Link Speed (MHz) |       |        |
|-----------------|------|---------|--------|
| Pkt Size (bytes) | 100  | 1000    | 10000  |
| 64              | 5.120   | 0.512   | 0.051  |
| 256             | 20.480  | 2.048   | 0.205  |
| 512             | 40.960  | 4.096   | 0.410  |
| 1024            | 81.920  | 8.192   | 0.819  |
| 1518            | 121.144 | 12.114  | 1.211  |

FIG. 2 of the accompanying drawings illustrates the delays experienced by small and large packets and mixed packets passing in succession through three nodes of a packet network. Because of the store and forward technique, smaller packets tend to catch up with larger packets as they all progress through the same path of a network. In order for a small packet to avoid incurring additional delays, it should not be transmitted too soon after a large packet. However, the necessary minimum interval between transmitting large and small packets is dependent on the number of elements in the network path and this cannot be predicted. Thus, the delay experienced by small timing packets is affected in a way which is disproportionate to overall network loading or traffic.

SUMMARY

According to a first aspect of the invention, there is provided a timing source for sending timing information via a packet network, comprising a first clock for generating the timing information, a packet-forming section for forming a sequence of packets of a substantially largest size which the network is capable of transporting, a time-stamping section for inserting into each packet of the sequence a transmission time derived from the timing information generated by the first clock, and an output section for forwarding the packets of the sequence to the network at the respective transmission times.

According to a second aspect of the invention, there is provided a timing source for sending timing information via a packet network, comprising a first clock for generating the timing information, a packet-forming section for forming a sequence of packets of at least two different sizes, a time-stamping section for inserting into each packet of the sequence a transmission time derived from the timing information generated by the first clock, and an output section for forwarding the packets of the sequence to the network at the respective transmission times.

The at least two different sizes may include the substantially largest size which the network is capable of transporting.

The sequence may comprise a distribution of the packets of the different sizes. The distribution may be substantially fixed with time. As an alternative, the distribution may vary with time. The distribution may vary in accordance with network traffic conditions.

The packet-forming section may be arranged to increase the number of smaller packets relative to the number of larger packets in response to an increase network traffic. The packet-forming section may be arranged to vary the distribution in accordance with network traffic information received from a destination of the sequence. The received information may be derived from the transit times to the destination of the packets of different sizes.

The output section may be arranged to forward the packets at regular intervals.

The packets may contain padding data and may be for carrying timing information only.

The packets may contain payload data associated with the timing information. The packet-forming section may be arranged to form the packets from incoming data of substantially constant data rate on a communication path. The incoming data may represent real-time events. The incoming data may comprise audio and/or video. The communication path may comprise a time division multiplex path.

According to a third aspect of the invention, there is provided a combination of a source according to the first or second aspect of the invention and a destination apparatus comprising a second adjustable clock and an arrangement for adjusting the second clock into synchronism with the first clock.

The adjusting arrangement may comprise a destination time-stamping arrangement for determining the local time of arrival of each packet of the sequence and a control circuit for adjusting the second clock as a function of differences in packet transit times. The packet transit times may be minimum transit times in consecutive time periods.

According to a fourth aspect of the invention, there is provided a method of sending timing information via a packet network, comprising generating the timing information, forming a sequence of packets of a substantially largest size which the network is capable of transporting, inserting into each packet of the sequence a transmission time derived from the timing information, and forwarding the packets of the sequence to the network at the respective transmission times.

According to a fifth aspect of the invention, there is provided a method of sending timing information via a packet network, comprising generating the timing information, forming a sequence of packets of at least two different sizes, inserting into each packet of the sequence a transmission time derived from the timing information, and forwarding the packets of the sequence to the network at the respective transmission times.

It is thus possible to provide an arrangement permitting improved quality of timing information sent via a packet network. For example, such a technique allows the quality of a timing reference to be improved when recovered after transportation over a packet network In applications where the largest packet size transportable over a packet network may be used for sending timing information, such timing packets do not suffer the undue degradation which would occur with the use of relatively small timing packets in the presence of other large packets in the network traffic. For example, propagation delay through a node of the network would be no faster than for other packets on the network so that timing packets suffer delays based substantially on statistical properties. This allows, for example, clock recovery algorithms at destinations to synchronise local clocks or recover timing information with improved performance.

In applications where the relatively large bandwidth required for such large packets is unavailable or where such use is undesirable, timing packets having a range or distribution of sizes may be used to achieve improved performance with reduced bandwidth requirement. The distribution may be substantially fixed over time or may respond to network traffic, for example by varying the proportions of larger packets over time. Improved performance may therefore be achieved with relatively little penalty in terms of extra bandwidth requirements over known systems.

DETAILED DESCRIPTION

Figure 1:
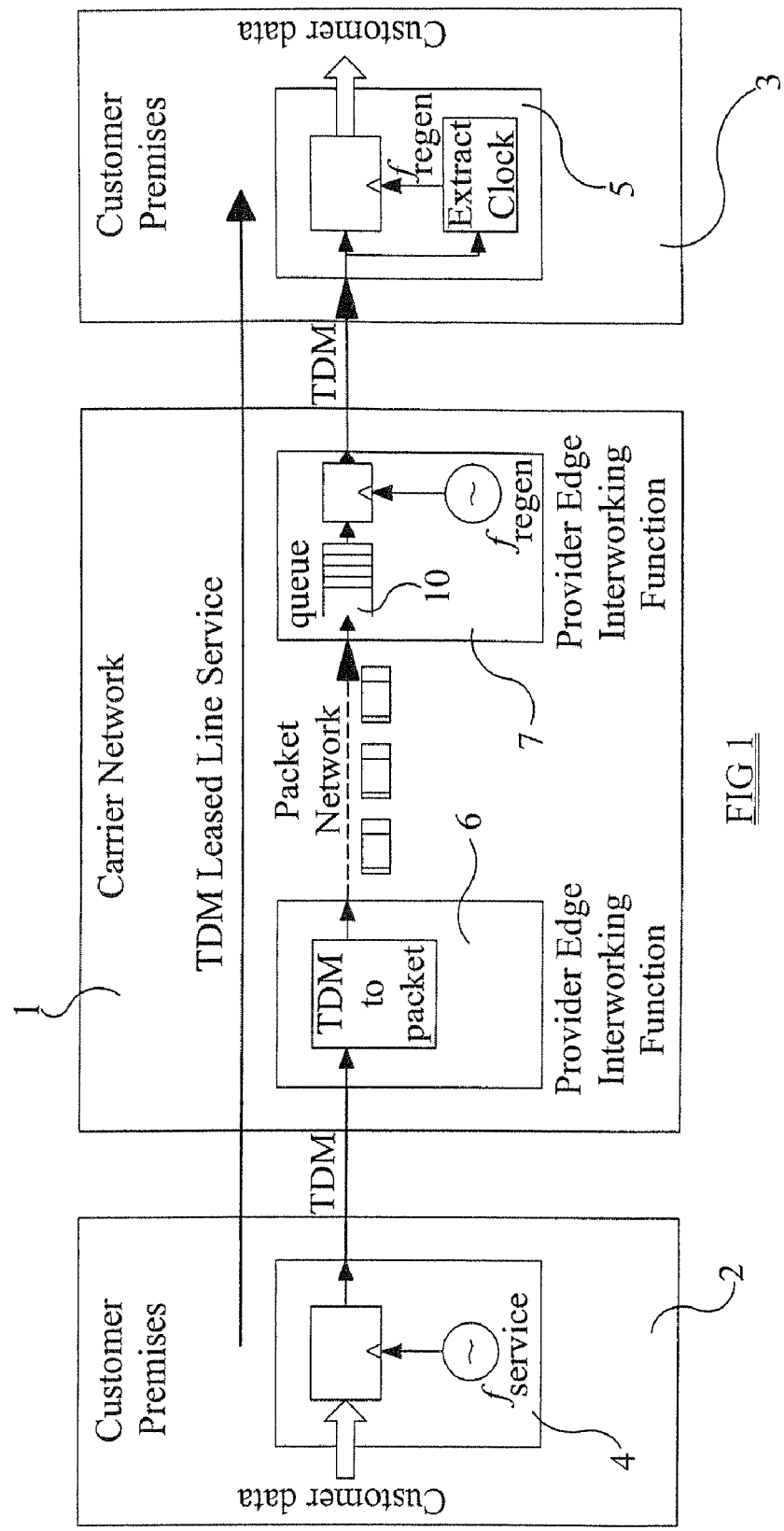
FIG. 1 is a block schematic diagram illustrating a known arrangement for transferring TDM data via a packet network.
Figure 2:
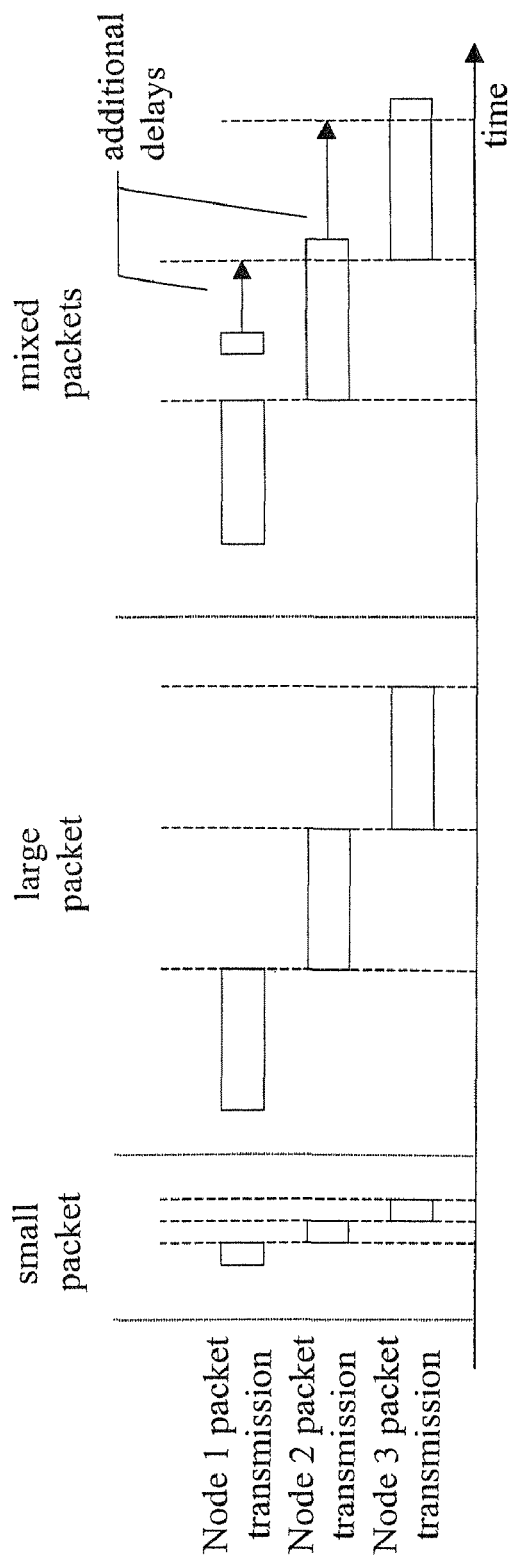
FIG. 2 is a graph illustrating propagation delays of packets of different sizes through a node of a packet network.
Figure 3:
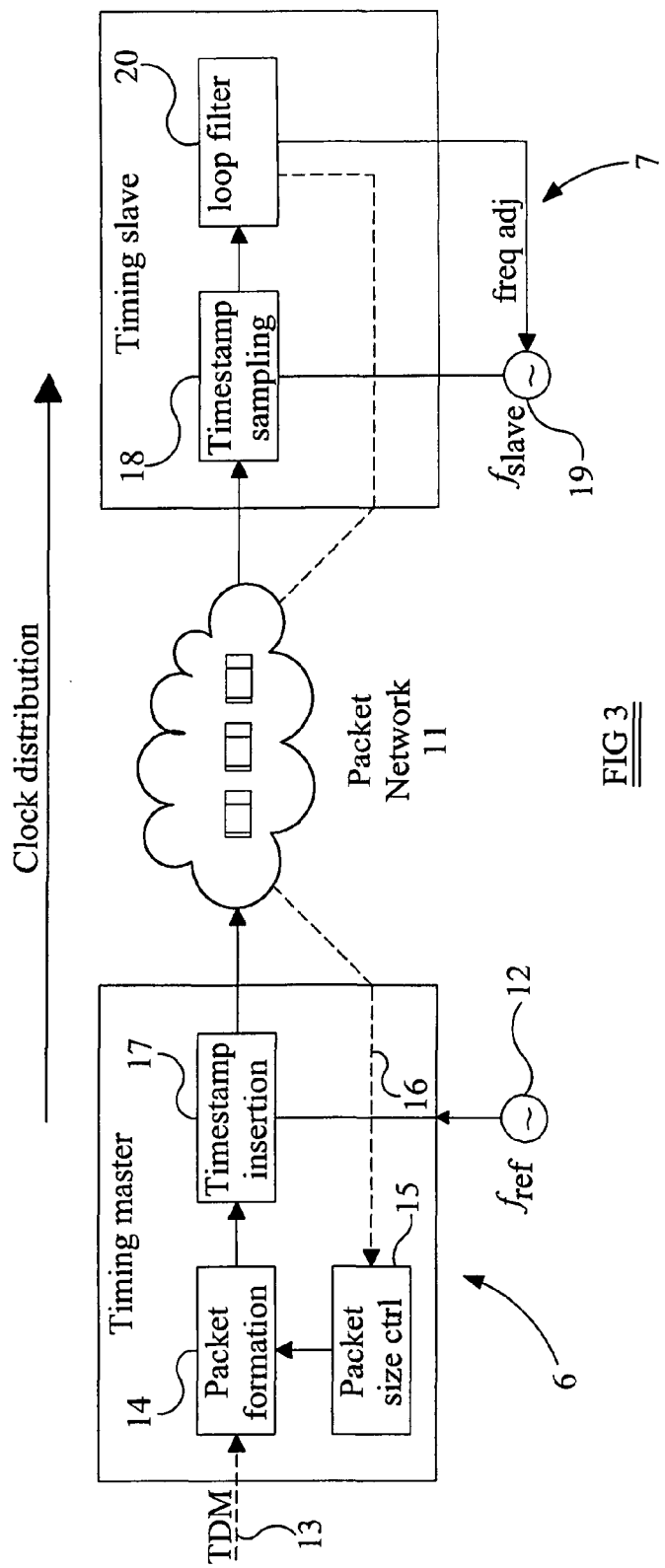
FIG. 3 is a block schematic diagram illustrating an arrangement for sending timing information across a packet network and including a timing source constituting an embodiment of the invention.

The arrangement shown in FIG. 3 is equivalent to the carrier network 1 shown in FIG. 1 and comprises interface nodes 6 and 7 providing a TDM service across a packet network 11. The sending node 6 acts as a timing source for sending timing information via the packet network 11 to the destination node 7. In the example illustrated, the timing information is generated by a first clock 12 which is locked relative to the bit rate, byte rate or frame rate of an incoming TDM data flow illustrated at 13. However, in other applications, the clock 12 may be an independent clock generating independent timing information which is to be transmitted to the destination node 7. The node 6 thus acts as a timing master whereas the node 7 acts as a timing slave.

The node 6 comprises a packet-forming section 14, which forms a sequence of packets for transmission to the destination node 7. Within the section 14, each packet is formed with a header which is sufficient in accordance with the protocol of the packet network 11 to permit delivery of the packet to the destination node 7. The packet is also provided with a payload which, in the case of the TDM application illustrated, comprises data from the TDM stream for delivery to the destination node 7. However, where the sending node 6 is merely supplying timing information without useful data, the payload may contain only padding without containing useful data for transmission across the network. The packets may also contain a combination of useful data and padding if appropriate to the application.

The packet forming section 14 is controlled by a packet size controller 15, which controls the size of the packets formed by the section 14. In one example of the controller 15, for example for use in applications where bandwidth use within the packet network 11 is not an issue, the controller 15 merely causes the packet forming section 14 to form all of the timing packets with the largest size, or close to the largest size, which the network 11 is capable of transporting. In other applications, for example where bandwidth is an issue, the packet size controller 15 controls the packet forming section 14 to establish a distribution of packet sizes forming the sequence for sending the timing information to the destination node 7. The distribution of packet sizes (i.e. the number of packets of each available size) may be fixed or may vary with time. For example, the distribution may vary in accordance with known trends in traffic conditions on the network 11. Alternatively, as illustrated by the broken line 16, the packet size controller 15 may receive information from the destination node 7 via a return, possibly lower bandwidth, path through the packet network 11 providing information about the prevailing conditions, for example related to the traffic conditions within the packet network 11. For example, this information may be related to the actual packet transit times determined at the destination node 7 so that the distribution of packet sizes transmitted by the sending node 6 can be varied to respond to the traffic conditions.

The following table illustrates a specific example of five different packet size distributions available where the node 6 sends 100 packets per second across a communication link through the packet network 11 having a data rate of 100 Megabytes per second.

| Packet size (bytes) | Pkts/s | | | | |
|---|---|---|---|---|---|
| 64 | 100 | 90 | 50 | 34 | 0 |
| 512 | 0 | 8 | 30 | 33 | 0 |
| 1518 | 0 | 2 | 20 | 33 | 100 |
| Bandwidth (%) | 0.06 | 0.11 | 0.40 | 0.56 | 1.22 |

In one embodiment of the packet forming section 14, these five distributions of packet sizes for the sequence of timing packets are selectable by the packet size controller 15. During normal traffic conditions and use, (the "default setting"), the controller 15 selects the distribution having 90 packets per 100 of the smallest packet size (64 bytes). With this distribution, there are three available packet sizes with the middle-sized packet (512 bytes) contributing 8 packets per 100 and the largest size (1518 bytes) contributing 2 packets per 100. This distribution occupies 0.11% of the available bandwidth for the 100 Mbps communication link. In the case where the distribution of packet sizes is selected based at least in part on information returned from the destination node, the selection may be based on the relative timing performance of the larger packets. Thus, any one of the packet size distributions illustrated in the above table may be selected in accordance with the prevailing conditions.

The packets from the section 14 are supplied to a time-stamping and output section 17, which inserts an accurate time-stamp into each packet as it is transmitted from the node 6 to the packet network 11. In particular, the time-stamp is derived from the first clock 12 supplying a reference frequency $f_{ref}$. The time-stamp represents the time of transmission referred to the local reference clock 12 and is used at the destination node to determine transmit times across the network 11. The packets are forwarded to the network 11 by the section 17 at regular intervals, for example every 10 milliseconds in the above-mentioned example where 100 packets are sent per second.

When each timing packet emerges from the packet network 11 at the destination node 7, it is time-stamped in a time-stamp sampling section 18. The difference in time-stamps inserted by the sections 17 and 18 gives an accurate measure of the transmission delay of the packet across the packet network 11 and this is used to control the "slave" clock 19 which, in this example, is to be synchronised with the clock 12. The local time-stamping in the section 18 may be derived from the clock 19 as shown in FIG. 3 but may alternatively be derived from a different clock, for example one which is not synchronised with the clock 12.

The clock 19 is controlled by a controller illustrated in FIG. 3 as a loop filter 20. The loop filter 20 performs a filtering operation to reduce the effects of packet delay variation so as to produce a frequency adjustment value which is applied to a control input of the clock 19. For example, the algorithm used for controlling the frequency $f_{slave}$ of the clock 19 (in the form of a digitally controlled oscillator) may be as follows:

$$F_m = F_{m-1} + G1(Y_m - Y_{m-1}) + G2(Y_m - \text{TransitTarget})$$

where:
$F_m$ is the requested frequency of the digitally controlled oscillator forming the clock 19
G1 is a proportional term for the loop gain;
G2 is an integral term for the loop gain;
$F_{m-1}$ is the current digitally controlled oscillator frequency;
$Y_m$ is the minimum packet transit time in the current time interval;
$Y_{m-1}$ is the minimum packet transit time in the previous time interval; and
TransitTarget is the desired target point for the Transit-Time.

An algorithm of this type is disclosed in EP 1455473, the contents of which are incorporated herein by reference. However, any suitable algorithm may be used for controlling the synchronisation of the clock 19 to the clock 12 based on the data available within the destination node 7. The clock 19 may be frequency-locked to the clock 12 so that the slave frequency $f_{slave}$ is close to the reference frequency $f_{ref}$ but slight frequency errors may occur over time so that there is a resulting phase offset. Alternatively, the clock 19 may be phase-locked to the clock 12 so that there is a substantially fixed phase-offset between the output of the clock 19 and the output of the clock 12. As a further alternative, the clock 19 may be phase-aligned to the clock 12 such that the output of the clock 19 is maintained in phase-alignment with the output of the clock 12.

The recovered clock or reference signal may be used for any suitable purpose at the destination node 7. In the case of TDM transmission across the packet network 11, the recovered clock may be used to convert the received packets back to the appropriate TDM format. However, this arrangement may be used for other applications, one other example of which is where the incoming data to the sending node 6 are real time data, for example representing audio or video signals, and are required to be returned to real time format at the output of the destination node 7 in the correct order and with the correct timing. An example of such an application is where a telephone connection has to be established across the packet network 11.

What is claimed is:

1. A timing source for sending timing information via a packet network, said timing source comprising;
    a clock for generating said timing information;
    a packet-forming section for forming a sequence of packets for conveying said timing information only, said packets containing padding data so that they are of a largest size which said network is capable of transporting, based on the availability of bandwidth in said network;
    a time-stamping section for inserting into each said packet of said sequence a transmission time derived from said timing information generated by said clock; and
    an output section for forwarding said packets of said sequence to said network at said respective transmission times.

2. The timing source as claimed in claim 1, in which said output section is arranged to forward said packets at regular intervals.

3. The timing source as claimed in claim 1, in which said packet-forming section is arranged to form said packets from incoming data of constant data rate on a communication path.

4. The timing source as claimed in claim 3, in which said incoming data represent real-time events.

5. The timing source as claimed in claim 4, in which said incoming data comprise at least one of audio and video.

6. The timing source as claimed in claim 3, in which said communication path comprises a time division multiplex path.

7. A system for transmitting timing information across a packet network, said system comprising:
    a timing source comprising a first clock for generating said timing information;
    a packet-forming section for forming a sequence of packets for conveying said timing information only, said packets containing padding data so that they are of a largest size which said network is capable of transporting, based on the availability of bandwidth in said network;
    a time-stamping section for inserting into each said packet of said sequence a transmission time derived from said timing information generated by said first clock, and an output section for forwarding said packets of said sequence to said network at said respective transmission times; and
    a destination apparatus for receiving said packets and for extracting therefrom said timing information.

8. The system as claimed in claim 7, in which said destination apparatus is arranged to act on said extracted timing information.

9. The system as claimed in claim 8, in which said destination apparatus comprises a second adjustable clock and an arrangement responsive to said extracted timing information for adjusting said second clock into synchronism with said first clock.

10. The system as claimed in claim 9, in which said adjusting arrangement comprises a destination time-stamping arrangement for determining a local time of arrival of each said packet of said sequence and a control circuit for adjusting said second clock as a function of differences in packet transit times.

11. The system as claimed in claim 10, in which said packet transit times are minimum packet transit times in consecutive time periods.

12. A timing source for sending timing information via a packet network, said timing source comprising;
    a clock for generating said timing information;
    a packet-forming section for forming a sequence of packets for conveying said timing information only, said packets being of at least two different sizes, at least one of the sizes containing padding data so that it is of a largest size which said network is capable of transporting, wherein the sequence comprises a distribution of said packets of said different sizes, and wherein the packet forming section is arranged to vary said distribution in accordance with one of traffic conditions on said network and trends in traffic conditions on said network;
    a time-stamping section for inserting into each said packet of said sequence a transmission time derived from said timing information generated by said clock; and
    an output section for forwarding said packets of said sequence to said network at said respective transmission times.

13. The timing source as claimed in claim 12, in which said distribution is fixed with time.

14. The timing source as claimed in claim 12, in which said distribution varies with time.

15. The timing source as claimed in claim 14, in which said distribution varies in accordance with traffic conditions on said network.

16. The timing source as claimed in claim 15, in which said packet-forming section is arranged to vary said distribution in accordance with network traffic information received from a destination of said sequence.

17. The timing source as claimed in claim 16, in which said received information is derived from transit times to said destination of said packets of different sizes.

18. The timing source as claimed in claim 12, in which said output section is arranged to forward said packets at regular intervals.

19. The timing source as claimed in claim 12, in which said packet-forming section is arranged to form said packets from incoming data of a constant data rate on a communication path.

20. The timing source as claimed in claim 19, in which said incoming data represent real-time events.

21. The timing source as claimed in claim 20, in which said incoming data comprise at least one of audio and video.

22. The timing source as claimed in claim 19, in which said communication path comprises a time division multiplex path.

23. A system for transporting timing information across a packet network, said system comprising:
- a timing source comprising a first clock for generating said timing information;
- a packet-forming section for forming a sequence of packets for conveying said timing information only, said packets being of at least two different sizes, at least one of the sizes containing padding data so that it is of a largest size which said network is capable of transporting, wherein the sequence comprises a distribution of said packets of said different sizes, and wherein the packet forming section is arranged to vary said distribution in accordance with one of traffic conditions on said network and trends in traffic conditions on said network;
- a time-stamping section for inserting into each said packet of said sequence a transmission time derived from said timing information generated by said first clock;
- an output section for forwarding said packets of said sequence to said network at said respective transmission times; and
- a destination apparatus for receiving said packets and for extracting therefrom said timing information.

24. The system as claimed in claim 23, in which said destination apparatus is arranged to act on said extracted timing information.

25. The system as claimed in claim 24, in which said destination apparatus comprises a second adjustable clock and an arrangement responsive to said extracted timing information for adjusting said second clock into synchronism with said first clock.

26. The system as claimed in claim 25, in which said adjusting arrangement comprises a destination time-stamping arrangement for determining a local time of arrival of each said packet of said sequence and a control circuit for adjusting said second clock as a function of differences in packet transit times.

27. The system as claimed in claim 26, in which said packet transit times are minimum packet transmit times in consecutive time periods.

28. A method of sending timing information via a packet network, said method comprising the steps of:
- at a timing source, generating said timing information;
- forming a sequence of packets for conveying said timing information only, said packets containing padding data so that they are of a largest size which said network is capable of transporting, based on the availability of bandwidth in said network;
- inserting into each said packet of said sequence a transmission time derived from said timing information; and
- forwarding said packets of said sequence to said network at said respective transmission times.

29. A method of sending timing information via a packet network, said method comprising the steps of:
- at a timing source, generating said timing information;
- forming a sequence of packets for conveying said timing information only, said packets being of at least two different sizes, at least one of the sizes containing padding data so that it is of a largest size which said network is capable of transporting, wherein the sequence comprises a distribution of said packets of said different sizes;
- varying said distribution in accordance with one of traffic conditions on said network and trends in traffic conditions on said network;
- inserting into each said packet of said sequence a transmission time derived from said timing information; and
- forwarding said packets of said sequence to said network at said respective transmission times.

* * * * *